(12) United States Patent
Wilhelm

(10) Patent No.: US 7,156,988 B2
(45) Date of Patent: Jan. 2, 2007

(54) FLOATING PRODUCT REMOVAL

(76) Inventor: Steven L. Wilhelm, 6467 NW. Sumac, Corvallis, OR (US) 97330

( * ) Notice: Subject to any disclaimer, the term of this patent is extended or adjusted under 35 U.S.C. 154(b) by 103 days.

(21) Appl. No.: 10/846,119

(22) Filed: May 14, 2004

(65) Prior Publication Data
US 2004/0226892 A1  Nov. 18, 2004

Related U.S. Application Data

(60) Provisional application No. 60/471,101, filed on May 16, 2003.

(51) Int. Cl.
C02F 1/40 (2006.01)

(52) U.S. Cl. ............ 210/170; 210/540; 210/747; 210/776; 405/128.2; 166/265

(58) Field of Classification Search ........... 210/747, 210/776, 800, 170, 242.3, 540, 923; 405/128.2, 405/129.85; 166/265, 266
See application file for complete search history.

(56) References Cited

U.S. PATENT DOCUMENTS

| | | | |
|---|---|---|---|
| 4,273,650 A * | 6/1981 | Solomon | 210/923 |
| 4,625,807 A * | 12/1986 | Harlow | 210/923 |
| 4,663,037 A * | 5/1987 | Breslin | 210/170 |
| 4,678,040 A * | 7/1987 | McLaughlin et al. | 210/800 |
| 4,934,458 A * | 6/1990 | Warburton et al. | 166/68 |
| 4,992,174 A * | 2/1991 | Caplan et al. | 210/170 |
| 5,082,053 A | 1/1992 | Bernhardt | |
| 5,128,052 A * | 7/1992 | Bullock | 210/923 |
| 5,143,606 A | 9/1992 | Bernhardt | |
| 5,171,104 A | 12/1992 | Bernhardt | |
| 5,173,092 A * | 12/1992 | Rudder | 210/747 |
| 5,180,503 A | 1/1993 | Gorelick et al. | |
| 5,224,837 A * | 7/1993 | Lamphere et al. | 210/104 |
| 5,281,333 A | 1/1994 | Bernhardt | |
| 5,302,286 A * | 4/1994 | Semprini et al. | 210/170 |
| 5,380,126 A | 1/1995 | Bernhardt | |
| 5,389,267 A | 2/1995 | Gorelick et al. | |
| 5,402,848 A | 4/1995 | Kelly | |
| 5,426,598 A | 6/1995 | Hagihara | |
| 5,547,589 A | 8/1996 | Carroll, II | |
| 5,622,450 A | 4/1997 | Grant, Jr. | |
| 5,855,775 A | 1/1999 | Kerfoot | |
| 5,879,108 A | 3/1999 | Haddad | |
| 5,910,245 A | 6/1999 | Bernhardt et al. | |
| 5,944,999 A | 8/1999 | Chancellor et al. | |
| 6,174,108 B1 | 1/2001 | Suthersan | |
| 6,312,605 B1 | 11/2001 | Kerfoot | |
| 6,533,499 B1 | 3/2003 | Breeding | |
| 6,746,605 B1 * | 6/2004 | Schindler | 405/128.2 |
| 2003/0189010 A1 * | 10/2003 | Wilhelm | 210/747 |

OTHER PUBLICATIONS

B. Herrling, J. Stamm, W. Buermann, *Hydraulic Circulation System for In Situ Bioremdiation and/or In Situ Remediation of Strippable Contamination*, in In-Situ Bioreclamation: Applications and Investigations for Hydrocarbon and Contaminated Site Remediation, 173 (1991).

* cited by examiner

*Primary Examiner*—Christopher Upton
(74) *Attorney, Agent, or Firm*—Kolisch Hartwell, P.C.

(57) ABSTRACT

A system and method for removing floating product from an aquifer. The system includes a groundwater-depressing mechanism configured to create a depression in a groundwater surface that encourages migration of floating product to the depression. The system also includes a floating-product extraction mechanism configured to separate floating product from the groundwater at the depression.

9 Claims, 4 Drawing Sheets

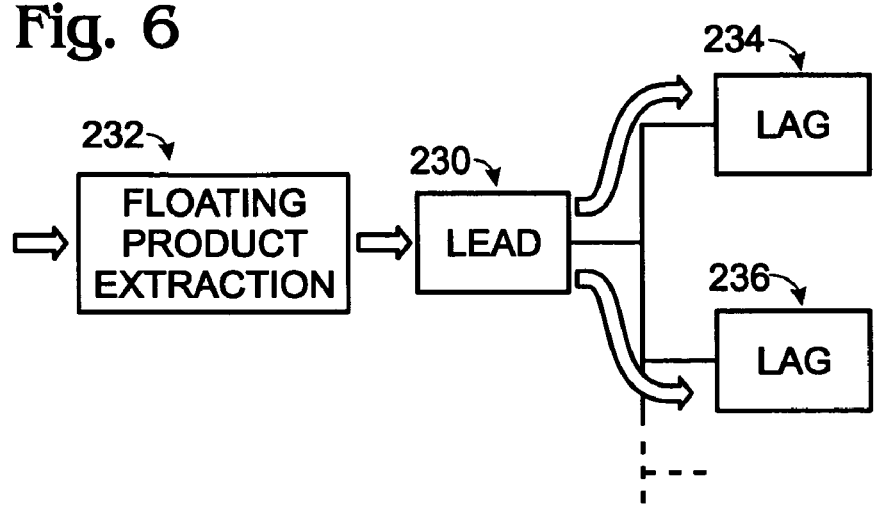
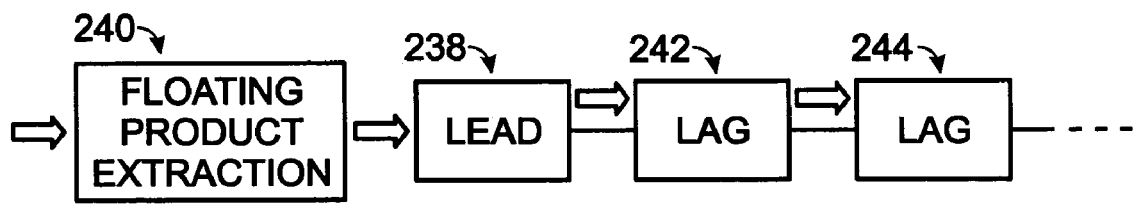

us 7,156,988 B2

FLOATING PRODUCT REMOVAL

CROSS-REFERENCE TO RELATED APPLICATIONS

This application claims the benefit of U.S. Provisional Application No. 60/471,101, filed May 16, 2003, which is hereby incorporated herein by reference.

BACKGROUND

Groundwater is often contaminated with gasoline, diesel fuel, and other lighter-than-water compounds or substances, which can form floating layers on the surface of the groundwater if the levels of contamination are high enough. The contamination comes from loss or disposal of wastes or products at or near ground surface, which then leak or leach to the aquifer. The contamination may dissolve into the groundwater as well as float on the surface of the groundwater. Floating contaminants pose a different removal challenge than dissolved contaminants.

Known techniques for removing floating contaminants from the surface of groundwater are less efficient and less successful than would be desirable. Skimmer pumps are commercially available that can be used to remove a floating layer of contaminant. However, available skimmer pumps seem to be less effective when the floating layer is below a minimum thickness. Though some skimmer pumps can remove the floating layer to a thickness of approximately 0.01-inch (sheen), the removal can be slow and require relatively close spacing of wells or the use of trenches dug into the ground to increase the capture efficiency. Trenches are difficult to dig at many sites, where space for such a feature can be lacking. Trenches are also restricted to use at sites with relatively shallow groundwater levels, approximately ten feet or less.

Other substances besides contaminants can also float on the surface of groundwater. For example, a substance intentionally applied to the groundwater for some purpose, such as removing a contaminant by extraction, may form a floating layer on the groundwater. Like contaminants, it can be desirable to remove such substances. However, as with contaminants, such substances can be difficult to effectively and efficiently remove from the surface of the groundwater. The term "floating product" is herein used to describe any such substance, whether contaminant or not, that forms on the surface of the groundwater.

BRIEF DESCRIPTION OF THE DRAWINGS

FIG. 6 schematically shows lag treatment portions connected in parallel to a lead treatment portion.

FIG. 7 schematically shows lag treatment portions connected in series to a lead treatment portion.

DETAILED DESCRIPTION AND BEST MODE

Figure 1:
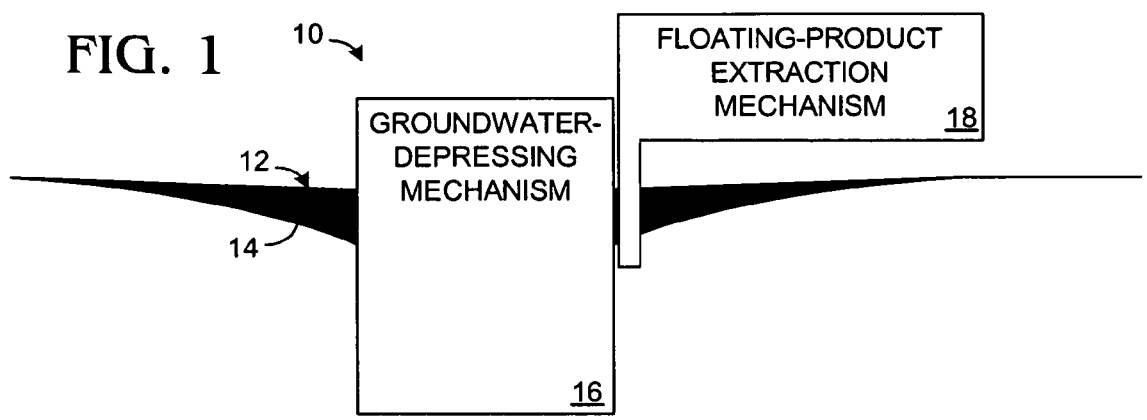
FIG. 1 schematically shows a groundwater treatment system for separating floating product from groundwater.

FIG. 1 schematically shows a groundwater treatment system 10 for removing floating product 12 from a groundwater surface 14. The groundwater treatment system includes a groundwater-depressing mechanism 16 configured to create a depression of the groundwater surface across which the floating product can migrate and/or in which the floating product can collect. The groundwater treatment system also includes a floating-product extraction mechanism 18 for separating the floating product from the groundwater at the depression created by the groundwater-depressing mechanism.

Any groundwater-depressing mechanism 16 that promotes a drawdown on the surface of the groundwater can be used. Such a drawdown can facilitate removal of floating product by at least two different effects. The floating product can migrate toward the low point or points of the drawdown, and/or the floating product can pool at or near the low point or points with a thickness that promotes easier and/or more rapid separation from the groundwater. Such effects may independently occur, jointly occur, or occur along with other effects that may facilitate floating product removal. Creating a drawdown can greatly improve floating product removal, because when the groundwater surface is relatively flat, floating product tends to statically rest on top of the groundwater surface or flow in a natural manner dictated by the aquifer. Under such conditions, collecting floating product at optimal rates may be difficult if not impossible. The exemplary groundwater-depressing means provided herein are in no way intended to limit the scope of this disclosure and should be interpreted as nonlimiting examples of the many possible groundwater-depressing mechanisms that can be used.

Similarly, any floating-product extraction mechanism that can at least substantially separate floating product from groundwater or otherwise facilitate the removal of floating product can be used. Floating product often times naturally remains in a discrete, or at least substantially discrete, layer on top of the groundwater. Such a layer can be separated from the groundwater, thus facilitating the removal of the floating product from the aquifer when that is desired. In some embodiments, floating-product extraction mechanism 18 can take the form of a skimmer pump. However, this is not required. Nonlimiting examples of other suitable floating-product extraction mechanisms include bailing and belt-type conveyor systems configured to move floating product out of the aquifer. The exemplary floating-product extraction means provided herein are in no way intended to limit the scope of this disclosure and should be interpreted as nonlimiting examples of the many possible floating-product extraction mechanisms that can be used.

Figure 2:
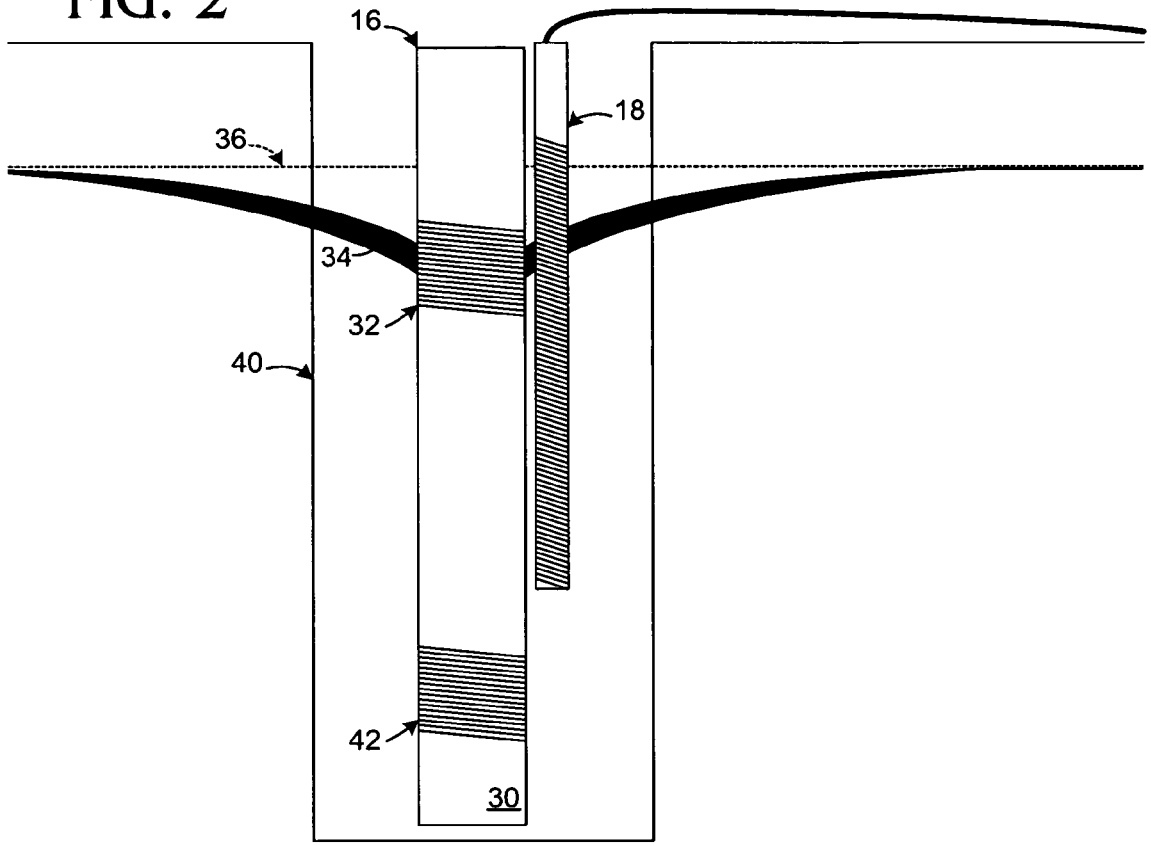
FIG. 2 schematically shows a side-view of an embodiment of FIG. 1.

FIG. 2 schematically shows a groundwater-depressing mechanism 16 in the form of a well 30. Well 30 includes an inlet 32 configured to receive groundwater from the aquifer. The groundwater surface may experience a drawdown 34 from a static groundwater level 36 as a result of the extraction of groundwater from the aquifer into the inlet. In other words, the groundwater surface near well 30 may be lower than the groundwater surface away from the well. Such a drawdown can encourage floating product to flow near the well and/or increase the thickness of the floating product around the well. In this manner, the drawdown may facilitate a rapid migration of floating product near the well, where it may be handled by a floating-product extraction mechanism.

The depth, radius, and or other characteristics of the drawdown may vary according to the configuration of the well, operating parameters, site conditions, etc. In general, more pronounced drawdowns may be achieved by establishing inlet 32 farther below a static groundwater level and/or increasing the volume of groundwater intake by the inlet. Although a drawdown as small as a few inches could be beneficial in removing floating product, more pronounced drawdowns may further aid in floating product extraction. Recirculating-type wells can be used to achieve drawdowns approximately twelve feet deep, or more, and seventy-three feet in radius, or more. At a site with medium-fine sand, for instance, such a drawdown can be achieved by pumping 10 gallons per minute. The above example is provided as one nonlimiting example of possible drawdown characteristics, and more or less pronounced drawdowns are within the scope of this disclosure.

In some embodiments in which a well is used to create a drawdown, the floating-product extraction mechanism may be positioned in the well that is used to create the drawdown. An exemplary arrangement of this type is described in more detail with reference to FIG. 4. In other embodiments, the extraction mechanism may be positioned outside of the well. If placed outside of the well, the extraction mechanism may be positioned in a different borehole than the borehole that the well is positioned within, or an extraction mechanism 18 can be positioned in a borehole 40 that also accommodates the well 30 that is used to create the drawdown, as shown in FIG. 2.

Water extracted from the aquifer into the inlet of a well may be returned back into the aquifer. For example, water drawn from the aquifer via an inlet may be returned to the aquifer through an outlet 42 in the same well. In some embodiments, an inlet in one well can be fluidically coupled to an outlet exterior that well and configured to return groundwater directly to the aquifer at a location away from the well. In some embodiments, groundwater can be returned to the aquifer without ever breaking the plane of the ground surface. Returning the groundwater directly to the aquifer can drastically improve the feasibility of a system. In such systems, there is no need to handle what can be large quantities of water that are brought above ground out of the aquifer. Therefore, restrictive regulations can be avoided, relative costs can be kept low, a greater range of sites can be treated, etc.

Although not required, groundwater that is removed from the aquifer at inlet 32 can be treated to remove dissolved product from the water. Treated groundwater can then be returned back into the aquifer. In some embodiments, groundwater that is removed from the aquifer at inlet 32 is not treated for dissolved contaminants before being returned to the aquifer. In such cases, alternative means of removing dissolved contaminants may be used at other points in the aquifer (e.g., down-gradient), or the water may not be treated for dissolved contaminants at all. Removing groundwater from the aquifer in this manner, without treating the groundwater to remove dissolved contaminants, can still be useful in creating a drawdown to facilitate the collection of floating product. Such a system may be useful, for example, at a site with significant quantities of floating product and less significant quantities of dissolved contaminants.

In embodiments that utilize a well with an inlet to create a drawdown, several different mechanisms can be used to move the groundwater into the inlet. For example, the water can be pumped by a submersible pump, such as a pump used in a residential drinking water well. Virtually any other type of pump may also be used. In some embodiments, air-lift pumping can be utilized, such as is used in density-driven convection wells. In some embodiments, air-lift pumping can strip some volatile contaminants from the groundwater as the water passes through the well, and that can be useful in affecting treatment of dissolved product. Alternatively, air-lift pumping can be used without any net removal of contaminants. It should be understood that virtually any other suitable method may be used to create a drawdown, and the above are provided as non limiting examples.

A groundwater-depressing mechanism can be configured to achieve a specific, steady, elevation of the groundwater surface. For example, flow rates may be increased or decreased to ensure that the groundwater remains at a desired predetermined level. In such embodiments, an instrument, such as a pressure transducer, can be installed in or near a groundwater-depressing well to measure groundwater elevation. Such measurements can be used, in the form of an operating signal, to control flow rates of the groundwater-depressing mechanism. Pumping rates can automatically be varied to compensate for changes in the natural groundwater level, such as due to seasonal fluctuations. In this manner, the actual groundwater level can be depressed to a desired level, which remains substantially constant, even as the natural groundwater level varies. Thus, the skimmer pump, or other floating-product extraction mechanism, will not have to move with a changing groundwater level. In other embodiments, changes in groundwater levels can be accommodated by floating or tracking the changing groundwater level with the floating-product extraction mechanism.

Figure 3:
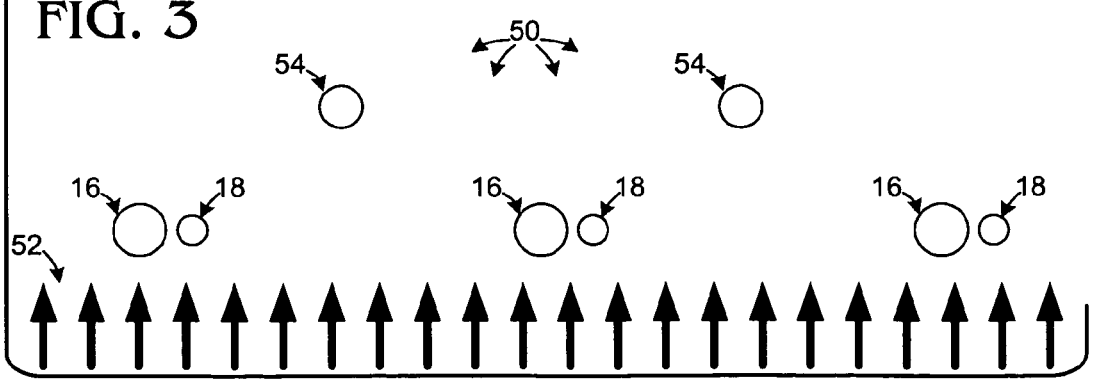
FIG. 3 schematically shows a top-view of a network of groundwater treatment systems for separating floating product from groundwater.

As is schematically shown in FIG. 3, a network 50 of groundwater treatment systems can be used to remove floating product from the surface of the groundwater. Such a network can be used to create a drawdown with a desired surface profile. As a nonlimiting example, two or more groundwater-depressing mechanisms can cooperate to establish a drawdown that covers a larger area and/or has a more complicated surface profile than can be formed with a single groundwater-depressing mechanism. For example, a row of groundwater-depressing mechanisms can be used to create a generally trough-like drawdown. In the illustrated embodiment, the groundwater treatment systems are arranged in such a row that is aligned perpendicular to a natural flow direction 52 of the groundwater. Such an arrangement is not required. The various groundwater treatment systems of a groundwater treatment network can be arranged to best serve a particular area.

One or more groundwater treatment systems of a network can optionally be configured as recirculating-type treatment systems capable of returning groundwater to the aquifer without breaking the plane of the ground surface. In the illustrated embodiment, each treatment system is a recirculating-type system that has a return outlet 54 "downstream" of the inlet. In some embodiments, the inlet and outlet can be in the same well.

Figure 4:
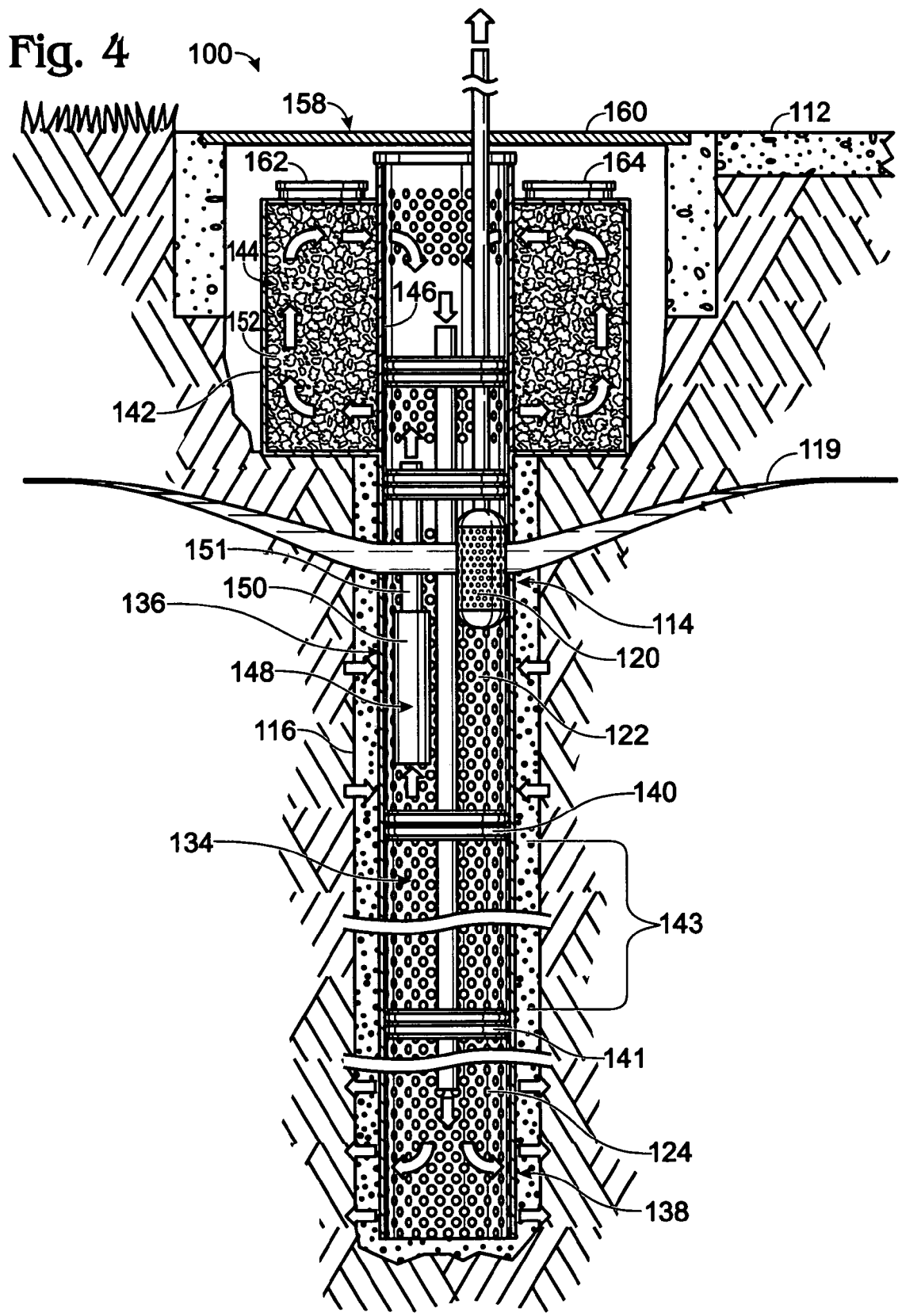
FIG. 4 shows a side, cross-section view of an exemplary in situ groundwater treatment system for subterraneanly treating groundwater contaminated with floating product and dissolved contaminants.

FIG. 4 schematically shows an exemplary subterranean groundwater treatment system 100 capable of reducing groundwater contamination that includes both floating contaminant portions and/or dissolved contaminant portions. In the illustrated embodiment, treatment system 100 can treat dissolved contaminants without moving the groundwater above a ground level 112. Groundwater treatment system 100 can also separate floating contaminant from the groundwater. In other words, groundwater treatment system 100 can treat the dissolved contaminant and remove the floating contaminant. As described above, some systems can be configured to treat only dissolved contaminant or floating product individually, and the combined treatment system is provided as a nonlimiting example.

Exemplary groundwater treatment system 100 includes a well casing 114 placed into a borehole 116 formed below ground level and extending below a static groundwater surface. The well casing may be sized to adequately service a particular location. Locations with deeper groundwater levels typically benefit from wells with relatively longer well casings, and locations with relatively high groundwater flow rates may benefit from well casings with larger diameters capable of treating more groundwater per unit time. The diameter of the portion of the well casing extending below the groundwater level typically is sized between approximately six inches and approximately sixteen inches, although casings with narrower, wider, and/or multiple diameters are within the scope of this disclosure. Casing lengths are often less than three-hundred feet, although longer casings may be used to treat contaminated groundwater that is deeper below ground level. Well casings may be constructed from polyvinyl chloride, steel, stainless steel, and/or other suitable materials.

Well casing 114 includes screens 134, which are segments that allow water to enter or exit the well casing. The screens facilitate the transfer of groundwater between groundwater treatment system 100 and the surrounding aquifer. The screens, which are illustrated schematically in the drawings, are typically slots or other openings that are cut or otherwise formed into the sidewalls of the well casing. In some embodiments, screens may take the form of a wire wrapped around support rods of the well casing. The wire helix may be wrapped so that the spacing between adjacent wire segments corresponds to a desired flow rate and/or level of filtration. For example, wider spacing generally corresponds to greater flow rates, while narrower spacing generally corresponds to increased filtration.

Well casings may include one or more screens depending on the precise configuration of a particular embodiment. When more than one screen is used, at least one of the screens may serve as an inlet screen for collecting groundwater, and at least one of the screens may serve as an outlet screen for returning groundwater to the aquifer. FIG. 4 shows such an arrangement, in which casing 114 includes an inlet screen 122 and an outlet screen 124, between which packers 140 and 141 are positioned, establishing an inlet portion 136 and an outlet portion 138.

As described above, groundwater may include dissolved contaminants as well as other contaminants that do not accumulate at the surface of the groundwater level. Such contaminants may be effectively treated using an in situ approach, in which the contaminated groundwater is treated below ground level, and returned to the aquifer. Some floating contaminants may not mix with groundwater and may instead float on top of the groundwater. Such contaminants are often referred to as floating contaminants, free product, or floating product. Although some floating contaminants can be treated with the same process used to treat dissolved contaminants, other methods may increase the effective life of treatment media used to treat dissolved contaminants, or otherwise provide a more desirable solution. In some embodiments, dissolved contaminants and floating product can be treated using different approaches that have been respectively designed to increase treatment effectiveness of the targeted variety of contaminant.

Exemplary groundwater treatment system 100 includes a skimmer pump 120 that is configured to remove floating product 119 from the aquifer. Once removed, the floating product may be pumped to a disposal reservoir, treated, or otherwise processed or reprocessed to produce a salable product. Skimmer pumps may be variously configured, and are only one example of a variety of devices that may be configured to remove floating product from the aquifer.

The skimmer pump may remove the floating product as it pools in or near the well, while the well operates in its normal manner to remove dissolved contaminants from water passing through the well. Rapid and complete flow of the floating product to the well and/or thicker layers of floating product formed in the well can increase the removal rate and removal completeness of the floating product. At sites with significant levels of floating product, a skimmer pump may increase the effective life of treatment media used to treat dissolved contaminants. Furthermore, a skimmer pump may be able to quickly remove the floating contaminant from the aquifer, where it may be disposed of properly, treated, or reprocessed.

Skimmer pump 120 may be placed in well casing 114. Existing skimmer pumps are small enough to fit inside a nominal 2-inch diameter well casing, and smaller pumps are contemplated, thus allowing for even smaller well casings. The skimmer pump can be selected to be of the type that automatically adjusts to variations in groundwater elevations. In this manner, some flexibility can be gained to accommodate the drawdown that is achieved. Also, the pumps may adjust to seasonal variations in groundwater level. In other embodiments, the skimmer pump, or other suitable mechanism for removing the floating product, can be placed out of the well casing in a separate well or other structure.

The water pumped through the well may be contaminated with dissolved contaminants, which may be derived from the floating product. By incorporating a treatment medium within the recirculating-type well, the contaminated Water can be treated as it passes through the well. Using carbon, for example, gasoline contaminants can be removed to non-detect levels. Thus, the water released from the well will not move contaminants from one interval of the aquifer to another interval of the aquifer. In this manner, the water is treated for the dissolved contaminants it contains.

An in situ well that includes a treatment portion for treating dissolved contaminants and a skimmer pump for treating floating product is a very versatile system for treating a wide range of sites. Such wells are easy to design, construct, and install. The wells are relatively inexpensive to operate, and require little labor or materials to monitor or maintain. Furthermore, such wells can have a very limited above-ground expression. The above-ground expression of the system, as installed, can be limited to a concrete pad and manhole flush with the ground surface, which can be less than six feet in diameter. In some embodiments, the above-ground expression may include a service pole and meter to convey electrical power to the system and/or an outlet for moving floating product from the skimmer pump to a disposal reservoir, such as a tanker truck. In some embodiments, such components are arranged below ground, such as in a manhole.

A well may be tuned to service a particular site based on actual aquifer response. The relative depths from which water is drawn into and released from a well casing may be established by positioning the inlet and outlet screens and/or moving one or more packers to establish the relative size and location of the inlet and outlet portions. Two or more packers, such as packers 140 and 141, may be set to bound a dead portion of the well casing, such as dead portion 143, which is not used for either water intake or expulsion, or is at least not in direct fluid communication with the subsequently described treatment portion. Through the use of screen placement, packer placement, and the plumbing set up between the various well portions, one or more inlet portions, outlet portions, and/or dead portions may be established in virtually any sequence along the well casing. For example, the inlet portion of the groundwater treatment system may be positioned above the outlet portion. Furthermore, the depth of the boundaries of adjoining portions may be controlled. In addition, the well may be further tuned by adjusting the flow rate of a pumping subsystem. Therefore, the well may be set up to better complement a particular aquifer, thus increasing its treatment effectiveness.

As can be seen in FIG. 4, well casing 114 varies in width along its length, with a top portion 142 of the casing having a relatively large diameter compared to the diameter of the lower well casing. Top portion 142 may be sized to accommodate a treatment portion 144, which is described in more detail below. A top portion diameter ranging from twelve inches to seventy-two inches is suitable for most embodiments. Smaller or larger diameters are also within the scope of this disclosure. Furthermore, in some embodiments, the top portion may not have a larger diameter for receiving a treatment portion, because the treatment portion may be positioned in another location, such as in a position flanking the well casing. Such a flanking arrangement may be useful because a relatively large amount of treatment media may be placed in such an arrangement. Furthermore, a treatment portion flanking more than one well may be used to service plural surrounding wells. In any case, such a flanking treatment portion may, in some embodiments, be positioned below ground, and may be integrally sealed with the rest of the treatment system, so that groundwater treated by such a periphery treatment portion remains in a sealed system throughout treatment.

Well casing 114 laterally defines the outer edge of each of inlet portion 136, outlet portion 138, and treatment portion 144. As described above, the treatment portion may have a relatively large diameter compared to the inlet portion or the outlet portion. Other deviations in casing diameter may also be established. Regardless of the diameter of a particular portion of the well casing, the well casing usually has generally circular horizontal cross sections. However, oval, polygonal, rectilinear, and/or other cross sectional geometries are also within the scope of this disclosure.

Figure 5:
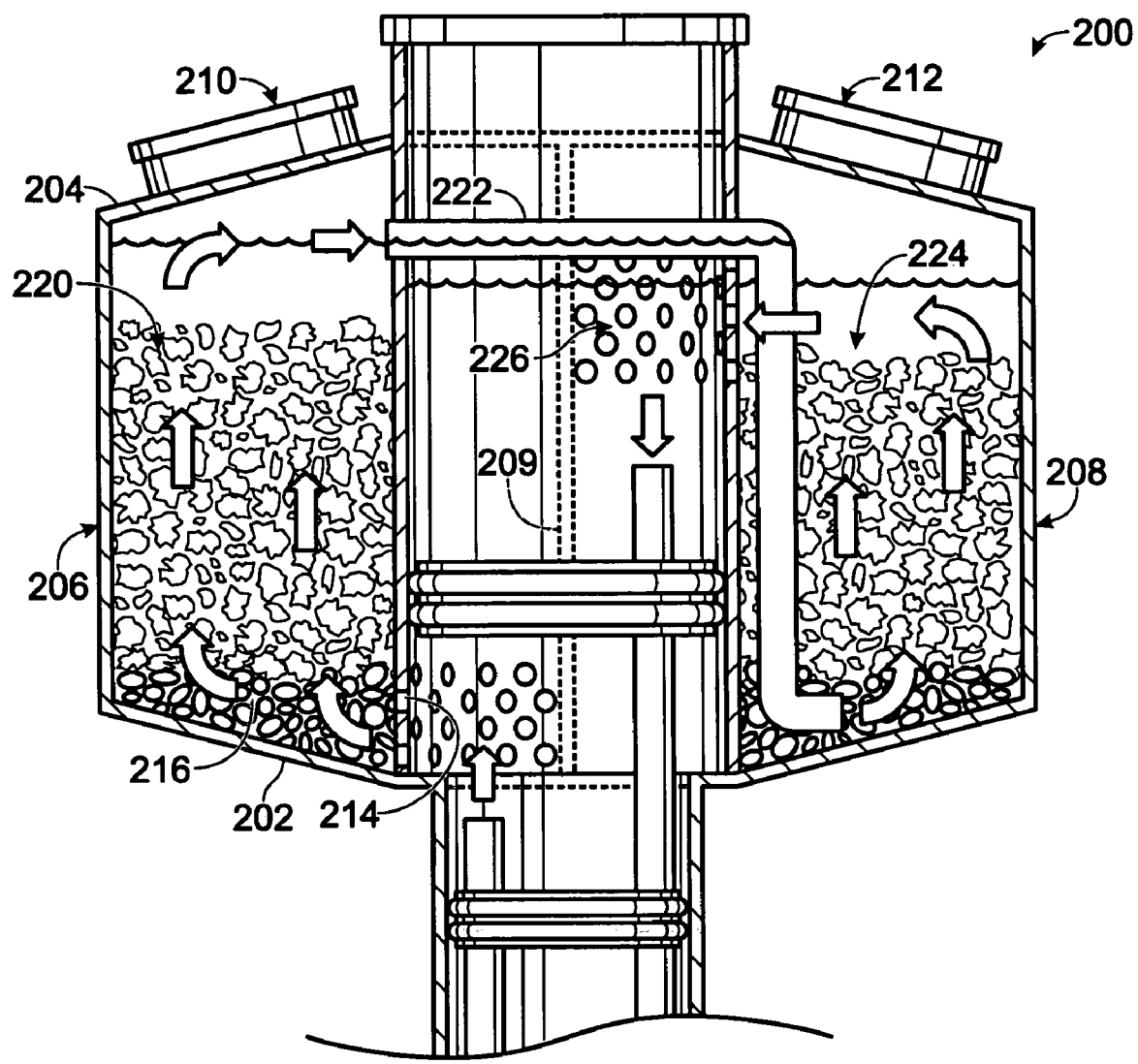
FIG. 5 shows a side, cross section view of an embodiment of a treatment portion compatible with the groundwater treatment system of FIG. 4.

While treatment portion 144 of FIG. 4 is laterally defined on the outside by the top portion of the well casing, an inner conduit 146 is present at an inside region of the treatment portion. The well casing and the inner conduit may be a monolithic structure, or the inner conduit may be a separate component that may be selectively positioned within the treatment portion. In FIG. 4, inner conduit 146 is concentrically aligned with well casing 114, and is the same diameter as the lower portion of the well casing. However, in other embodiments, the inner conduit may be differently sized relative to the well casing. For example, as shown in FIG. 5, the inner conduit may have a larger diameter than the lower portion of the well casing. The inner conduit may facilitate holding treatment media in the treatment portion of the well, and may include screens through which the water may enter and exit the treatment portion of the well. In this manner, treatment media may be contained within the treatment portion and at least substantially prevented from moving to other portions of the treatment system. Thus, the treatment media may be easily replaced, as described below.

Groundwater treatment system 100 includes a pumping subsystem 148 that moves groundwater from inlet portion 136 to treatment portion 144. The pumping subsystem may be configured to move groundwater via applied pressure through the treatment media, to the outlet portion, and into the aquifer. In this manner, the pumping system may control the relative pressures at various locations throughout the groundwater treatment system to encourage groundwater to travel through the treatment path of the system. In particular, the system can be sealed at all points except the inlet and outlet so that water at the outlet portion of the well can be over-pressured, or pressured to a level greater than the aquifer. Thus, water at the outlet portion may be forced back into the aquifer at an increased rate. The ability to over-pressure water at the outlet portion of the system provides increased flexibility in tuning a well to a particular treatment site. Pumping subsystem 148 includes a submersible pump 150. As shown, the pumping subsystem also includes an inlet fluid path, or pipe, 151 for directing fluid from pump 150 to treatment portion 144.

Depending on the particular arrangement of treatment, inlet, and outlet portions, groundwater treatment systems according to the present disclosure may include additional and/or alternative plumbing for moving groundwater from one location to another. As exemplified by pump 150 and fluid path 151, the plumbing may be positioned within the well casing. Such internal positioning of the plumbing may reduce the difficulty and cost of installing and maintaining a groundwater treatment system. Because all of the plumbing, and other components, may be internalized within the well casing, the entire system may be fit into a borehole without requiring any lateral digging and/or trenching.

The pumping capacity of the pumps may be selected according to the desired groundwater surface drawdown, flow rate, well depth, amount of treatment media, lateral extent of the treatment zone around the well, etc. Such pumping parameters may be calculated as described in the following article, the contents of which are incorporated by reference: B. Herrling, J. Stamm, W. Buermann, *Hydraulic Circulation System for In Situ Bioremediation and/or In Situ Remediation of Strippable Contamination*, in *In-Situ Bioreclamation: Applications and Investigations for Hydrocarbon and Contaminated Site Remediation* 173 (1991). However, other flow rates may be preferable; for example, flow rates lower than suggested by Herrling et al. may increase the effectiveness of dissolved contaminant treatment or greater flow rates may generate a more exaggerated drawdown which can be used to better facilitate floating product removal.

Treatment portion 144 may include one or more treatment media 152, which is used to reduce contamination of groundwater. The treatment portion may be charged with one or more different types of treatment media, which may be suited for removing various types of contamination. Because the configuration of the disclosed groundwater treatment systems facilitates the replacement of exhausted treatment media with fresh, or at least less exhausted, treatment media, a treatment system may effectively service an area for a much longer period of time than the treatment life of one charge of treatment media. Furthermore, the types and/or amounts of treatment media employed at a given well may be conveniently changed to customize groundwater treatment. Thus, the groundwater treatment systems are highly effective, versatile, and have a relatively long life span.

Treatment media 152 typically includes adsorptive and/or reactive media, which are selected to reduce one or more dissolved contaminants from groundwater. An example of an adsorptive medium, which has proven particularly effective at treating a wide variety of dissolved contaminants is carbon, such as granular activated carbon. However, virtually any adsorptive and/or reactive media may be utilized. In fact, because of the customizable configuration of the treatment portion, virtually any treatment media capable of treating groundwater when groundwater passes through or by the media may be used. Similarly, two or more different types of treatment media may be used in the same system to increase treatment effectiveness. The arrangement disclosed herein provides great flexibility, allowing for the use of treatment media in solid or liquid form.

Treatment media may be used to treat volatile organic compounds, semi-volatile contaminants, metals, ionic contaminants, and explosives. Treatment media may also be used to treat dissolved contaminants that would otherwise need to be treated using expensive, complicated, or less effective methods. For example, the disclosed groundwater treatment systems may be used to treat contaminants that are mobilized with surfactants, contaminants that are treated with reactive barriers, and compounds that can be treated with catalyzed reactions. Some of these contaminants may not be effectively treated using prior art in situ methods, such as air stripping. The following table illustrates some of the contaminants that may be treated along with some of the treatment media that may be used to treat such contaminants. It should be understood that the contaminants listed below are nonexclusive examples of treatable contaminants, and the listed treatment media are similarly nonexclusive examples of media that may be used to treat such contaminants.

| Contaminant | Treatment Media |
| --- | --- |
| benzene, toluene, ethylbenzene, and/or xylene (BTEX), trichloroethene (TCE), tetrachloroethene (PCE), 1,1,1 trichloroethane, and carbon tetrachloride | carbon, |
| naphthalene, methyl tertiary-butyl ether (MTBE), and methyl ethyl ketone (MEK) | carbon |
| lead, chromium, cadmium, selenium, and mercury | ion-exchange resins, minerals such as apatite |
| arsenic, nitrate, sulfate, and perchlorate | ion-exchange resins, reducing medium such as composted manure |
| Hexahydro-1,3,5-trinitro-1,3,5-s-triazine (RDX) and Trinitrotoluene (TNT) | carbon, zero-valent iron, |
| PCE and tar contamination | surfactants, carbon |
| PCE, and TCE | iron filings |
| TCE, PCE, and other chlorinated compounds | palladium catalysis media, ultra-violet light |

As shown in FIG. 4, groundwater enters the well near the top of the lower portion of the well via an inlet portion 136 of a screen 134. Inside the well at the surface of the groundwater, floating product may be collected with a skimmer pump 120 or similar device for separating floating contaminant from the groundwater. The groundwater, which has been separated from the floating product, is pumped from the inlet portion of the well to the treatment portion of the well, where it fills the treatment portion of the well. The treated groundwater overflows the treatment portion of the well and moves through plumbing coupling the treatment portion of the well to outlet portion 138 of the well. Near the bottom of the well, the treated groundwater is expelled through an outlet portion 138 of screen 134. FIG. 4 illustrates a nonlimiting example of a plumbing configuration that may be implemented, and it should be understood that other arrangements are within the scope of this disclosure. For example, other embodiments may include flowing the water downward through the treatment medium, rather than upward.

As is shown in FIG. 4, groundwater is treated for dissolved contaminants without being moved above ground level. Furthermore, groundwater treatment systems may be sealed. Such sealing may also facilitate establishing pressure differentials, such as an over-pressuring near an outlet portion, to better control groundwater flow. As shown in FIG. 4, the groundwater treatment system may be contained in a manhole 158. In particular, treatment portion 144 may be easily accessed by moving manhole cover 160, which is positioned near ground level. Manhole cover 160 may be configured to be lifted off of the manhole, hinged away from the manhole, slid away from the manhole, or otherwise moved to gain access to the manhole and the treatment system. Manhole 158 is one example of a design that facilitates replacement of exhausted treatment media with fresh treatment media. In other embodiments, a different mechanism for accessing the treatment portion of the well may be utilized.

Manhole 158 has a minimal surface expression, while still providing adequate access to the treatment system. The entrance to the manhole, or manhole cover, may be substantially level with the ground surface, so that vehicles may pass over the treatment system. Therefore, the treatment system is suitable for use on roadways or other areas in which a system with a larger surface expression would not work. Furthermore, the disclosed treatment provides at most negligible appreciable sound at the surface. Therefore, such treatment systems provide uninvasive treatment of contaminated groundwater.

Treatment portion 144 includes seals 162 and 164, which may be selectively opened and closed to obtain access to treatment media 152. Seals 162 and 164 are schematically illustrated, and other sealing mechanisms may be used in other embodiments. Seals 162 and 164 may be opened so that exhausted treatment media may be replaced with fresh treatment media. The media may be replaced while the treatment portion of the groundwater treatment system remains below ground level. For example, the treatment portion may be unsealed and the treatment media may be removed by a suitable method, such as a high-powered vacuum. Fresh treatment media may then replace the exhausted media. As described above, the treatment portion may be located near ground level, and may be easily accessed via a manhole, or similar structure. Furthermore, the treatment media may be substantially confined within the treatment portion, so that most treatment media does not enter the lower, or any other, portion of the treatment system. Therefore, treatment media of the system may be referred to as replaceable treatment media, which may be exchanged by emptying and refilling the treatment portion.

Depending on the type or types of treatment media used to treat a particular location and the precise configuration of the treatment portion, treatment media may be loaded in a variety of ways. For example, treatment media may be packaged in cartridges that may be inserted into the treatment portion, or the treatment media may be placed into the treatment portion in the media's natural form. Because the treatment portion is laterally bound by the well casing, when the treatment media is removed, the well does not collapse.

FIG. 5 shows another treatment portion 200, which may be used to treat contaminated groundwater. The illustrated treatment portion may be incorporated into the systems shown in FIG. 4, or other suitable systems. Treatment portion 200 includes a shaped bottom 202 and a shaped top 204. Although shown with somewhat conical shapes, it should be understood that the tops and bottoms may be shaped as bowls or with other suitable geometries, including flat geometries. Treatment portion 200 includes a lead treatment segment 206, which occupies one side of treatment portion 200, and a lag treatment segment 208, occupying the other side of the treatment portion. The lead and lag portions may be separated by a generally vertical divider 209. The lead and lag portions may occupy about the same volume, or they may be differently sized relative to one another. Lead treatment segment 206 may be accessed by seal 210, while lag treatment segment 208 may be accessed by seal 212. Lead and lag units may also be vertically arranged, possibly within the same volume, with one located on top of the other.

Treatment portion 200 includes a lower entrance 214, through which pumped groundwater may enter lead segment 206 from an inlet portion of a well. The lower entrance may include a screen, a one-way valve, a flow restrictor, or other suitable mechanism for receiving water from below. Shaped bottom 202 may be filled with collection gravel 216, such as two to three inch drain rock, into which the groundwater may be pumped. As water is pumped through entrance 214, lead segment 206 may fill. The lead treatment segment includes a treatment media 220 for treating groundwater. Because the groundwater fills the lead segment from the bottom up, the treatment media will generally remain submerged, which is advantageous for some varieties of treatment media.

Near the top of the lead segment, an overflow fluid path 222 allows water from the lead segment to move into lag treatment segment 208. As in the lead segment, the lag treatment segment may include collection gravel 216 in the shaped bottom. Lag treatment segment 208 may be filled with a treatment media 224, which may be of the same or a different variety as treatment media 220. As water moves into the lag portion, treatment media 224 further treats the water. Near the top of the lag portion, a return 226 provides a fluid path from treatment portion 200 to an outlet portion of the well. In other embodiments, additional treatment portions may be included, through which the groundwater may be directed before returning to the outlet portion of the well.

Plumbing may be established between two or more treatment portions so that the various portions receive groundwater in series, parallel, or a combination of series and parallel. Before groundwater is delivered to one or more dissolved contaminant treatment portions, floating product can be separated from the groundwater so as not to tax the dissolved contaminant treatment portion. FIG. 6 shows a lead treatment portion 230 receiving groundwater from a floating-product extraction mechanism 232 and passing, in parallel, the groundwater to lag portion 234 and lag portion 236. FIG. 7 shows an example of a series connection, in which a lead portion 238 passes groundwater from a floating-product extraction mechanism 240 to a lag portion 242, which in turn passes the groundwater to another lag portion 244. The above are provided as nonlimiting examples, and other arrangements may be used while remaining within the scope of this disclosure.

As herein described and illustrated, groundwater treatment systems may be self-contained treatment facilities capable of independently treating groundwater, although two or more treatment systems may be installed near one another to treat a larger area. The individual groundwater treatment systems may be designed with a relatively linear expression, so that the treatment system may be installed into a borehole. In other words, a straight borehole may be formed at a desired treatment location, and a treatment system may be placed into the borehole. Such an installation provides several advantages over the installation of more complicated treatment systems, which typically require lateral trenching away from the borehole and control stations above ground level. Using the disclosed treatment system, a manhole, or suitable entrance, may provide access to the treatment system without requiring any structure rising above ground level. Because of the substantially linear expression of the system, the manhole need not be substantially larger than the upper portion of the well and can even be smaller in some embodiments.

Although the present disclosure has been provided with reference to the foregoing operational principles and embodiments, it will be apparent to those skilled in the art that various changes in form and detail may be made without departing from the spirit and scope of this disclosure. The present disclosure is intended to embrace all such alternatives, modifications and variances that fall within the scope of the appended claims. Where the disclosure or claims recite "a," "a first," or "another" element, or the equivalent thereof, they should be interpreted to include one or more such elements, neither requiring nor excluding two or more such elements.

What is claimed is:

1. A groundwater treatment system, comprising:
   a groundwater-depressing mechanism configured to create a depression in a groundwater surface that encourages migration of floating product to the depression wherein the groundwater-depressing mechanism includes a well having an inlet configured to bring water into the well from an aquifer, and the well includes an outlet configured to return the water from the well to the aquifer; and
   a floating-product extraction mechanism configured to separate floating product from the groundwater at the depression.

2. The groundwater treatment system of claim 1, wherein the outlet is configured to return the water below where the inlet is configured to bring the water into the well.

3. The groundwater treatment system of claim 1, wherein the well is configured to treat the water for dissolved contaminants.

4. The groundwater treatment system of claim 1, wherein the groundwater-depressing mechanism and the floating-product extraction mechanism are constituent elements of a common well.

5. The groundwater treatment system of claim 1, wherein the floating-product extraction mechanism includes a skimmer pump.

6. The groundwater treatment system of claim 1, wherein the groundwater depressing mechanism includes a dissolved-contaminant treatment module.

7. The groundwater treatment system of claim 1, wherein the groundwater-depressing mechanism is one of a network of groundwater-depressing mechanisms configured to create at least one drawdown in the groundwater.

8. The groundwater treatment system of claim 7, wherein the network of groundwater-depressing mechanisms are aligned in at least one row substantially perpendicular to a groundwater flow direction.

9. The groundwater treatment system of claim 7, wherein the floating-product extraction mechanism is one of a network of floating-product extraction mechanisms, each configured to separate floating product from the groundwater at a drawdown.

* * * * *